(12) United States Patent
Kesler

(10) Patent No.: US 6,815,000 B2
(45) Date of Patent: Nov. 9, 2004

(54) JERKY PRODUCT AND METHOD OF PRODUCING THE SAME

(76) Inventor: David L. Kesler, 1560 Timberlane Rd., Sabetha, KS (US) 66534

( * ) Notice: Subject to any disclaimer, the term of this patent is extended or adjusted under 35 U.S.C. 154(b) by 0 days.

(21) Appl. No.: 10/354,592

(22) Filed: Jan. 29, 2003

(65) Prior Publication Data

US 2004/0146634 A1 Jul. 29, 2004

(51) Int. Cl.$^7$ ................................................. A23J 3/00
(52) U.S. Cl. ........................ 426/656; 426/634; 426/574
(58) Field of Search ................................. 426/656, 634, 426/574

(56) References Cited

U.S. PATENT DOCUMENTS

| | | | |
|---|---|---|---|
| 3,488,770 A | * 1/1970 | Atkinson | 426/104 |
| 3,930,033 A | * 12/1975 | Corliss et al. | 426/103 |
| 4,061,784 A | * 12/1977 | Youngquist | 426/93 |
| 4,141,999 A | * 2/1979 | Lolas | 426/104 |
| 4,305,965 A | * 12/1981 | Cheney | 426/104 |
| 4,376,134 A | * 3/1983 | Kumar | 426/656 |
| 4,863,749 A | * 9/1989 | Yamada | 426/241 |
| 5,731,029 A | 3/1998 | Karwowski et al. | |
| 5,736,186 A | 4/1998 | Holdren et al. | |
| 5,773,070 A | 6/1998 | Kazemzadeh | |
| 6,238,726 B1 | 5/2001 | Fischer | |
| 6,270,830 B1 | 8/2001 | Kamada et al. | |
| 6,277,420 B1 | 8/2001 | Andersen et al. | |
| 6,386,748 B1 | * 5/2002 | Huber et al. | 366/79 |
| 6,410,079 B2 | 6/2002 | Chenk et al. | |

* cited by examiner

Primary Examiner—Anthony Weier
(74) Attorney, Agent, or Firm—Hovey Williams LLP

(57) ABSTRACT

A jerky product resembling real meat jerky and methods of forming the same are provided. Generally, methods of forming jerky include providing an extruded dry material including a non-meat protein isolate and starch. The dry material is hydrated thereby forming a moist material which is then formed into an elongated body and dried to a moisture content of about 15–24% by weight. Smoke flavor may be added to the body by a smoking step or by the addition of an artificial smoke flavoring during the formulation thereof.

23 Claims, No Drawings

JERKY PRODUCT AND METHOD OF PRODUCING THE SAME

BACKGROUND OF THE INVENTION

1. Field of the Invention

The invention generally pertains to an essentially meatless product, and more preferably a soy protein based product, which resembles jerked meat and methods of forming the same. The jerky of the present invention is formulated and processed so as to have the look and feel of an actual meat jerky product.

2. Description of the Prior Art

Primarily due to its high protein and low fat content, many attempts have been made to utilize soy in the manufacture of edible products which resemble those made from real meat. However, difficulties in mimicking the flavor and texture of meat have prohibited certain soy products (including jerky products) from gaining widespread appeal.

Some jerky products, such as those disclosed in U.S. Pat. No. 5,731,029, comprise small quantities of soy protein (up to 20% by weight) mixed with high quantities of meat (at least about 50%). While, this product purports to resemble naturally prepared jerky, the product still relies upon a substantial meat content in order to impart the desired flavor and texture properties and the soy protein merely acts as a filler.

Similarly, U.S. Pat. No. 6,410,079 discloses a jerky treat for dogs and cats comprising a grain mix including soybean meal and small amounts of starch. However, this product still comprises almost 50% meat and meat by-product.

Attempts at making a truly soy-based jerky product have thus far met with mixed results. In addition to overcoming flavor and texture difficulties, problems in extrusion of the soy mixture have also been encountered. One such extrusion difficulty has been the soy material flowing faster through the middle of the die leading to puffing in the center of the extrudate.

In order to form a product which is capable of retaining a particular shape, it may be necessary to mechanically break down the soy protein fibers. Bowl chopping is one such mechanical method of breaking down the protein fibers. However, once the fibers are broken down, a binder, such as soy gluten or other soy derived materials, must be added to the protein in order form the shaped product. The addition of a binder results in a further processing step and increased production costs.

SUMMARY OF THE INVENTION

The present invention overcomes the problems outlined above and provides an edible composition resembling jerked meat and methods of producing the same. Generally, methods according to the invention comprise providing a dry material comprising a protein isolate source and starch. The protein isolate source may be selected from any non-meat source such as dairy protein isolates, legume isolates including wheat gluten, canola isolate, cottonseed isolate, sunflower isolate, soy isolate, and mixtures thereof, with soy protein isolate being preferred. As used herein, the term "non-meat" in reference to the protein source denotes any protein source which does not comprise the tissue of an animal, such as muscle tissue, for example. The term "non-meat" does not exclude dairy protein sources such as protein isolated from milk. Any food-grade starch known to those of skill in the art may be used in forming the dry mixture, especially starch selected from the group consisting of wheat starch, potato starch, tapioca starch, rice starch, corn starch and mixtures thereof with wheat starch being preferred. The dry material preferably comprises from about 55–85% by weight protein isolate, more preferably from about 60–80% by weight, and most preferably from about 65–75% by weight. The dry material also comprises from about 15–45% by weight starch, more preferably from about 20–40% by weight and most preferably from about 25–35% by weight. All weight percentages expressed herein are based upon the weight of the entire composition being 100% unless stated otherwise.

The dry material is preferably formed by mixing the protein isolate and starch in a ribbon blender. The mixture is then fed to an extrusion device, such as a TX-57 extruder available from Wenger Manufacturing, Inc., Sabetha, Kans., where the mixture is hydrated and extruded for at least partially cooking the starch and texturizing the protein isolate. The extrudate is then dried to a moisture content of from about 5–8% by weight, thereby enabling the extrudate to be stored for extended periods of time before undergoing additional processing. The resulting dry material is preferably in the form of rods which may be cut into portions of desired length for ease of handling in subsequent processing steps. However, it is within the scope of the present invention to forego the extrudate drying step and move directly into formation of the jerky product.

A quantity of water is then added to the dry material thereby forming a moist material. The quantity of water added may be varied depending upon the desired properties of the resulting moist material. While it is possible to add an excess amount of water to the dry material, doing so is less desirable as it will necessitate an additional processing step in order to remove the water which is not absorbed into the material. It is preferable to add a specific amount of water which, when mixed with the dry material, will give a moist material having a preselected moisture content. It is preferable for the moisture content of the moist material to be from about 55–85% by weight, more preferably from about 60–80% by weight, and most preferably from about 65–75% by weight. When adding an excess of water to the dry material, it is preferable to let the dry material soak in the water for up to about 30 minutes. The excess water is removed from the moist material by, for example, pressing the material so as to squeeze the excess moisture out or placing the material in a centrifugal device. When adding a specific, non-excess amount of water, the water and dry material should be stirred until substantially all of the water has been absorbed into the material.

Following hydration, the moist material is formed into an elongated body and cut into portions of desired length. Formation of the elongated body is preferably carried out using a commercial quality grinder former, however, any device, such as a meat grinder or meat stuffer, having a die attached to the outlet thereof may be used. It is preferable that the elongated body have a cross-sectional configuration (perpendicular to the length of the body) that at its widest is between about ¾–2 inches, preferably 1½ inches, and about ⅛–5/16 inch, preferably 3/16 inch, at its narrowest Preferably, this cross-sectional configuration is oval or rectangular.

The elongated body is then dried to a particular moisture content, preferably 15–24% by weight, more preferably 18–23% by weight, and most preferably 20–22% by weight. The drying is performed by placing the body in a dryer for a period of time sufficient to bring the moisture content of the body down to the desired level. Preferably, the drying time is about 6–8 hours. The temperature inside the dryer is preferably from about 110°–180° F., more preferably from about 120–170° F., and most preferably from about 130°–165° F. It is also preferable during the drying step to heat the body to a temperature of at least about 165° F. in order to kill any bacteria present within the body. In order to provide for as great a shelf-life as possible, it is preferable for the final dried jerky product to have a water activity of less than about 0.8, and more preferably from about 0.6–0.7. The final jerky product comprises from about 35–50% by weight protein isolates and preferably from about 40–45% by weight. The starch content of the jerky product is from about 10–25% by weight and preferably from about 15–20% by weight.

In preferred embodiments, the body is subjected to a smoking step in order to impart a "natural smoke" flavor to the jerky product. The smoking step may be carried out in conjunction with the drying step or carried out as a completely separate step immediately following extrusion formation of the elongated body. If the smoking step is carried out as a part of the drying process, wood chips (preferably hickory chips) or other flavor enhancing materials are burned during the first portion of the drying process, for up to about 4 hours. If the smoking step is carried out as a completely separate step, the body is placed in a smoker or other suitable smoking assembly for about 3–6 hours and more preferably for about 4–5 hours and wood chips (preferably hickory) or other flavor enhancing materials are burned. The temperature within the smoker is preferably between 90°–120° F. depending on location relative to the heat source.

Alternatively, smoke flavor may be added to the moist material prior to elongated body formation. Powdered smoke flavor and other liquid and dry flavorings may be added to the material in order to provide a desired flavor. Addition of flavorings may decrease the overall time required for jerky production as it eliminates the need for a separate smoking step.

In addition to any natural or artificial smoke flavor, other flavor enhancing ingredients may be included in the jerky formulation. For example, between about 1–4% by weight beef flavoring may be added to provide a real meat taste to the jerky. Various other flavorings, spices, and seasonings such as chicken, pork, bacon, teriyaki, jerky, and buffalo wing flavorings may also be added to the formulation. It is preferable that the added flavorings and seasonings comprise between 2–4% by weight, and more preferably between 2.5–3.5% by weight of the entire jerky composition. Sodium erythorbate which acts as an anti-caking agent and also accelerates product curing action is often included in various seasoning mixtures. However, the use of sodium erythorbate is disfavored due to certain perceived health risks associated with its use. Therefore, it is preferable to avoid the use of sodium erythorbate. Sodium nitrate which acts as a preservative may also be added to the moist material. However, given that the jerky product will preferably have a low water activity, the use of a preservative agent may also be omitted. Furthermore, in certain applications, it is desirable to closely monitor the total sodium content of the final jerky product so that the product contains less than about 4% by weight sodium. Consequently, it may be preferable to minimize or avoid altogether the use of sodium erythorbate or sodium nitrate in the product formulation.

Coloring agents may be employed to provide a natural meat color to the jerky product. Such coloring agents include FD&C Red #40, caramel color, and beet powder.

DETAILED DESCRIPTION OF THE PREFERRED EMBODIMENT

The following examples set forth preferred jerky compositions according to the present invention and preferred methods of making the same. It is to be understood, however, that these examples are provided by way of illustration and nothing therein should be taken as a limitation upon the overall scope of the invention.

Example 1

In this example, approximately three pounds of an extruded material comprising 26% by weight wheat starch and 66% by weight soy protein isolate (the material having a total moisture content of about 8%) was hydrated in excess water for approximately 30 minutes. After hydration, the excess water was removed from the wet material by hand pressing the material in a colander. After removal of the excess water, the material was ground through a ⅜ in breaker plate using a meat grinder. Seasonings, sodium nitrate, and FD&C Red #40 were added to flavor the material and give the material a color resembling actual meat. The material was then passed through a meat grinder having a meat die with 3/16 in holes. A final Teflon® (die having an opening of 1½×3/16 in. was placed on the end of the meat grinder in order to produce wet jerky strips. It is understood that a commercial grinder former device may be used in place of the meat grinder when preparing large quantities of jerky.

The strips were kept refrigerated until they could be placed in a smokehouse. The strips were smoked for a period of about 4–5 hours at a temperature ranging from 90°–120° F. (depending upon the location inside the smokehouse relative to the heat source). After the smoking process, the temperature within the smokehouse was increased to 120°–170° F. (again, depending on location relative to the heat source). The strips were dried for an additional 6 hours. During the smoking and drying process, the location of the strips in the smokehouse was varied so as to ensure uniform drying. Once dry, the strips were placed in a vacuum sealed pouch.

The soy jerky product had the look and taste of real meat jerky, however, the soy jerky had a slightly different, or slick, mouth feel than real meat jerky.

Example 2

In this example, the same procedure was employed in Example 1, with several slight variations. Instead of removing the excess water from the wet material by pressing the material in a colander, a centrifugal device was used with excellent results. A different Teflon® die was also used having an opening of 1½×¼ in. The thicker slot made a better strip which did not exhibit gaps and tears as were experienced when using the thinner slot die.

Example 3

In this example, the same procedure was employed as in Example 2, however, about 3.5% by weight of beef flavoring was added to the material along with seasonings which did not include any sodium erythorbate or sodium nitrate. This product had a moisture content of 26.8% by weight and a water activity of 0.72.

Example 4

In this example, the procedure of Example 3 was employed with several variations. Instead of hydrating the dry material in an excess of water, a predetermined quantity of water was added to give a wet mixture having a moisture content of 67.7% by weight. After the addition of the water, the material was stirred until the water was completely absorbed. Consequently, no excess water needed to be removed, and the step of water removal using a centrifugal device was omitted.

The material was then passed through a meat grinder having a meat die with 3/16 in. holes. A final Teflon® die having an opening of 1½×3/16 in. was placed on the end of the meat grinder in order to produce wet jerky strips. The wet jerky strips were placed into a dryer. During the first four hours of the drying process, hickory chips were burned within the dryer to impart a smoke flavor to the jerky.

Then, the temperature was raised to about 155° F. and the strips dried for an additional 4 hours to a moisture content of 22%.

I claim:

1. A method of forming an edible composition consisting essentially of the steps of:
   providing a dry material comprising a non-meat protein isolate source and starch;
   forming a moist material by the addition of a quantity of water to said dry material;
   forming said moist material into an elongated body; and
   drying said elongated body to a moisture content of between about 15–24% by weight.

2. The method of claim 1, including forming said dry material by:
   forming a hydrated mixture comprising said non-meat protein isolate and said starch;
   extruding said hydrated mixture for at least partially cooking said starch and texturizing said protein;
   and drying said extrudate to a moisture content of from about 5–8% by weight.

3. The method of claim 1, wherein said elongated body forming step comprises passing said moist material through a die.

4. The method of claim 1, wherein said drying step includes placing said body in a dryer at a temperature from about 110°–180° F. for about 6–8 hours.

5. The method of claim 4, wherein said drying step includes heating said body to a temperature of at least about 165° F.

6. The method of claim 1, including the step of smoking said body for about 4–5 hours at a temperature of from about 90°–120° F. prior to said drying step.

7. The method of claim 1, including the step of adding from about 1–4% by weight beef flavoring to said moist material.

8. The method of claim 1, wherein said dry material comprises from about 55–85% by weight non-meat protein isolate.

9. The method of claim 1, wherein said dry material comprises from about 15–45% by weight starch.

10. The method of claim 1, said starch being selected from the group consisting of wheat starch, potato starch, tapioca starch, rice starch, corn starch and mixtures thereof.

11. The method of claim 1, said non-meat protein isolate source being selected from the group consisting of dairy protein isolates, wheat gluten, canola isolate, cottonseed isolate, sunflower isolate, soy isolate, and mixtures thereof.

12. The method of claim 11, said non-meat protein isolate being soy protein isolate.

13. A method of forming an edible composition comprising the steps of:
   providing a dry material comprising from about 55–85% by weight of a non-meat protein isolate and from about 15–45% by weight starch;
   forming a moist material having a moisture content of about 55–85% by weight by the addition of a quantity of water to said dry material;
   forming said moist material into an elongated body using a forming device that does not significantly heat said moist material; and
   drying said elongated body to a moisture content of between about 15–24% by weight.

14. The method of claim 13, including forming said dry material by:
   forming a hydrated mixture comprising said non-meat protein isolate and said starch;
   extruding said hydrated mixture for at least partially cooking said starch and texturizing said protein;
   and drying said extrudate to a moisture content of from about 5–8% by weight.

15. The method of claim 13, wherein said elongated body forming step comprises passing said moist material through a die.

16. The method of claim 13, wherein said drying step includes placing said body in a dryer at a temperature from about 110°–180° F. for about 6–8 hours.

17. The method of claim 16, wherein said drying step includes heating said body to a temperature of at least about 165° F.

18. The method of claim 13, including the step of smoking said body for about 4–5 hours at a temperature of from about 90°–120° F. prior to said drying step.

19. The method of claim 13, including the step of adding from about 1–4% by weight beef flavoring to said moist material.

20. The method of claim 13, said starch being selected from the group consisting of wheat starch, potato starch, tapioca starch, rice starch, corn starch and mixtures thereof.

21. The method of claim 13, said non-meat protein isolate source being selected from the group consisting of dairy protein isolates, wheat gluten, canola isolate, cottonseed isolate, sunflower isolate, soy isolate, and mixtures thereof.

22. The method of claim 11, said non-meat protein isolate being soy protein isolate.

23. A method of forming an edible composition comprising the steps of:
   providing a dry material comprising from about 55–85% by weight of a non-meat protein isolate and from about 15–45% by weight starch;
   forming a moist material having a moisture content of about 5 5–85% by weight by the addition of a quantity of water to said dry material;
   forming said moist material into an elongated body in such a manner so as to avoid puffing of said moist material; and
   drying said elongated body to a moisture content of between about 15–24% by weight.

* * * * *